Feb. 22, 1927.

P. D. HARTOG

PISTON

Filed July 21, 1926

1,618,658

INVENTOR
Paul D. Hartog

Patented Feb. 22, 1927.

1,618,658

UNITED STATES PATENT OFFICE.

PAUL D. HARTOG, OF ST. LOUIS, MISSOURI.

PISTON.

Application filed July 21, 1926. Serial No. 124,053.

This invention relates more particularly to pistons for use in internal combustion engines.

Since the head of the piston in an internal combustion engine is in direct contact with the high heat temperature generated in the combustion chamber, the head portion therefore expands in advance of the other portions which are more remotely connected with the head.

One of the objects of this invention is to so design and construct the piston that the initial expansion of the head is utilized in such a way that the body of the piston is enabled more properly to perform its function. This is done by overcoming undue frictional resistance which frequently results in the binding and chafing of the piston, rendering its further use impracticable.

Another object of this invention is to construct the piston in such a way that the conduction of heat from the head to the body of the piston is so interrupted or otherwise hindered that the surrounding contacting bodies are sufficiently heated. Thus, these surrounding bodies are in a state of expansion which exists practically simultaneously with the state of expansion of the body of the piston.

Another object of this invention is to so construct the piston that the expansion of the head operatively actuates that portion of the body near the head in a direction opposite to that of the expansion of the head and to thereby maintain substantially constant the effective size of the body of the piston within this zone.

To such ends this invention comprises a piston having a head and body, connecting members for the head and body, spaced openings designed and so disposed whereby the conduction of the heat temperature from the head to the body is reduced to a minimum, and a portion of the body of said piston is resiliently yieldable and operatively actuated by the expansion and contraction of the head of the piston.

Figure 1:
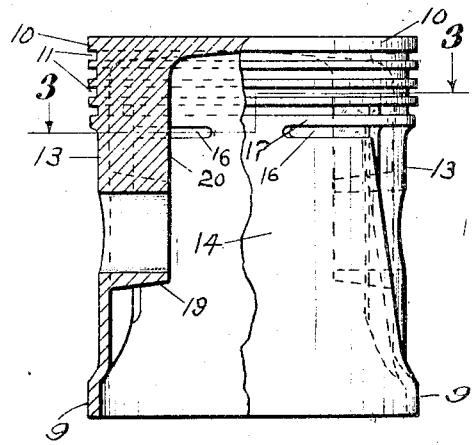
Figure 2:
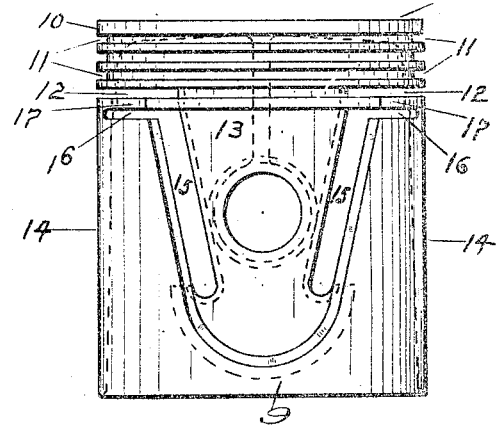
Figure 3:
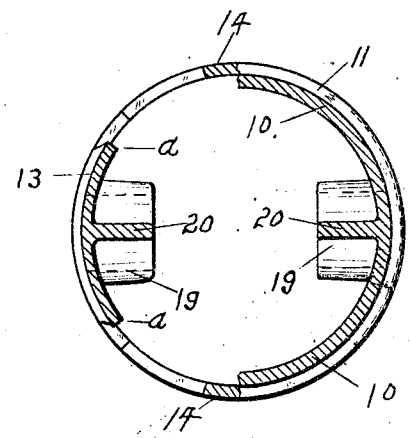

For the purpose of enabling others skilled in the art to which this invention relates to understand, make and use the same the following description is given supplemented by the accompanying drawing, in which:

Fig. 1 is a side elevation, partly in section.
Fig. 2 is a front elevation.
Fig. 3 is a horizontal section taken along the line 3—3 Fig. 1.

Figure 4:
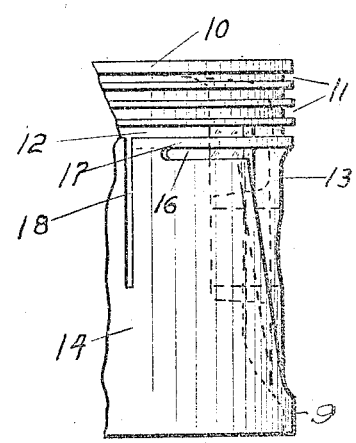

Fig. 4 is a fragmentary elevation illustrating an alternative side thrust face of the body of the piston.

The head portion 10 has the usual packing ring grooves 11 with this difference, however, that the lowermost ring groove 12 is cut entirely through the side walls of the head 10 and extends semi-circularly therearound interrupted only by the integral connection of the ribs or connectors 13, the width of which is more clearly illustrated in Figure 3 at points a—a.

The connectors or boss-carrying portions 13, as illustrated, are positioned axially lengthwise of the piston, connecting with the head portion 10 beneath the lowermost ring groove 12, inwardly offset from the exterior contour of the body of the piston, extending downwardly from the head and connecting with the body of the piston at a narrow margin 9 above the lower extremity thereof.

The connectors 13 are spaced away from the body 14 of the piston by openings 15 therebetween, which openings extend approximately the full length of the connectors and terminate in arcuately formed openings 16 which extend circumferentially for a limited distance around the body of the piston and which are positioned so that the openings 12 in the lowermost ring groove form that which may be termed arcuate ribs 17 which ribs are isolated from direct heat conduction to which the head 10 is subjected.

The ribs 17, therefore, are more or less independent of the expansion of the head of the piston, in consequence of their being isolated from the direct conduction of the heat from the head, and therefore the head portion will, when heated uniformly, expand throughout its entire area in advance of the isolated ribs 17, and as a result the head 10, during the process of expansion, will carry the ribs or connectors 13 which are integrally connected with the head 10, radially outward. The ribs 17 will as a result of the outward expansion of the head 10 deflect radially inward, a direction opposite to that of the expansion of the head. This is because the sidewardly arcuate portions of the ribs tend to become chords of arcs as tension is applied from opposite connectors 13. The upper portion of the body or bearing portions 14 within the zone of the ribs 17 having a certain capacity of resiliency, will yield radially inward due to the force caused by the inward deflection of the ribs 17. It should be here noted that the head 10, having connections with ribs 13 but being otherwise isolated by the openings or gaps 12, spaced openings 15, and the radial openings 16 that the only path for heat conduction would be over the entire head 10 and down through the connectors 13. Therefore the expansion of the head 10 will carry the connectors 13 in a radial outward direction and in so doing will exert a force which will deflect radially inward the ribs 17 and the resilient portion of the body 14 within this zone. The rib members 13 are provided with wrist pin receiving bosses 19 and integral therewith and extending therefrom upwardly and forming integral connections with the interior portion of the head are strength reinforcement ribs or fins 20. Fig. 4 illustrates how added resiliency may be superinduced at the thrust surfaces of the body 14. Vertical slots 18 are formed in these thrust faces connecting with the openings 12 and extending a limited distance downwardly in the body.

The above action may be summarized and further explained in the following manner:

When heat is applied to the head it can flow to the body only by way of the connectors 13 and the ribs 17. These members provide little cross sectional conducting area. Furthermore heat is conducted from the connectors 13 by way of the wrist pin and to the connecting rod which is associated with the piston. Oil which plays upon the bosses 19 and ribs 20 increases this conducting effect whereby the thrust surfaces are robbed of heat which might otherwise flow to them.

The arcuate ribs 17 do not supply much heat to the thrust surfaces, first, because the cross sectional area of these ribs is relatively small and, second, because these ribs engage the cylinder wall whereby heat is conducted from the ribs about as fast as it flows in. The play of oil on the inner surfaces of the ribs also aids in conducting heat away from them and consequently away from the thrust surfaces of the body.

The net result of the above phenomenon, is that although heat is flowing into the head of the piston, thereby maintaining the head at a relatively high temperature, yet little of this heat is ever transmitted to the thrust surfaces. What little heat does flow to these surfaces is quickly conducted away through the oil film between the surfaces and the cylinder wall. Hence, the thrust surfaces are maintained at a lower temperature than the head, which head influences the radial expanding action of the connectors 13.

It should be noted that the ribs 17 serve at once, as bracing members between the connectors 13 and the thrust surfaces, and also as members adapted to convert the radial movements of the connectors 13 into a drawing-in action at the thrust surfaces, as hereinbefore described.

Another point of importance comprises the fact that, not only does the limitation of heat flow to the thrust surfaces reduce their tendency to expand, but added to this, the reduced tendency of movement results in the described mechanical inter-action whereby the greater movements of the connectors 13 under action of the highly heated head tend to pull in the thrust surfaces. The relatively great expanding action of the non-thrust surfaces of the connectors 13 does not affect the operation adversely because these surfaces are almost wholly depressed and therefore do not bind in the cylinder. The undepressed portions 9 are so small in area that their binding action is negligible.

One way of stating the above action is to say that the coefficient of expansion of the body in a plane parallel to the wrist pin is greater than the coefficient of expansion in a plane perpendicular to the wrist pin. This is because the last-named coefficient is restricted by the pulling-in action on the thrust surfaces. This reduction in the coefficient of expansion with respect to a predetermined plane or axis is a principle which is distinct from the principle of mere differential expansive action. The latter would be attained merely by raising two different portions of the piston to different temperatures with a constant coefficient of expansion.

The coefficient is varied in the predetermined plane by introducing the forces in the manner above stated, that is, by forming the piston with the slots and ribs as shown. By forming a single casting with the slots, connectors and ribs as shown, the heat flow is controlled and the interaction of forces controlled.

It is obvious from the foregoing that the piston thus described fulfills the purpose for which it is intended and it is conceded that various changes may be made in the size and form of the invention thus set forth within the scope of the appended claims and therefore is not to be limited to the details shown and described.

Having thus described the invention what I claim as new and desire to secure by Letters Patent of the United States is:

1. A one-piece piston comprising a head portion, boss-carrying portions extending downwardly therefrom, and bearing portions, means for limiting heat flow from the head to the bearing portions, and means for reducing the coefficient of expansion of the bearing portions in a predetermined plane, said last-named means comprising elongated ribs joining the boss-carrying portions to the upper ends of the bearing portions, said ribs having the circular contour of the cylinder into which the piston fits.

2. A one-piece piston comprising a head portion, boss-carrying portions extending downwardly therefrom, bearing portions, means for limiting heat flow from the head portion to the bearing portions, and means for reducing the coefficient of expansion of the bearing portions in a predetermined plane, said last-named means comprising arcuately formed elongated ribs joining the head portion and the bearing portions and forming part of the generally cylindrical contour of the piston.

3. A piston comprising a head portion, a body portion, connectors between said head and body portions carrying a wrist pin, the connectors joining the head at their upper ends above the wrist pin and the body at their lower ends below the pin, elongated ribs joining the upper ends of the connectors with the upper ends of the body, said head and body being isolated at all points except at said ribs, said ribs having a contour corresponding to that of the body whereby their ability to conduct heat to the body is limited because of conductive action to the cylinder wall in which the piston operates.

4. A one-piece piston comprising a head portion, a body portion, connectors between said head and body portions carrying bosses for a wrist pin, internal bracing fins joining the bosses with said head, said wrist pin and said fins being adapted to carry away heat, the connectors joining the head at their upper ends above the wrist pin and the body at their lower ends below the wrist pin, elongated ribs joining the upper ends of the connectors with the upper ends of the body, said head and body being isolated at all points except at said ribs, said ribs having the circular contour of the cylinder into which the piston fits.

5. A piston comprising a head portion, a body portion, connectors between said head and body portions carrying bosses for a wrist pin, bracing fins joining the bosses with said head, said wrist pin and said fins being adapted to carry away heat, the connectors joining the head at their upper ends above the wrist pin and the body at their lower ends below the wrist pin, elongated ribs joining the upper ends of the connectors with the upper ends of the body, said head and body being isolated except at said ribs, said ribs having a contour corresponding to that of the body whereby their ability to conduct heat to the body is limited because of conductive action to the cylinder wall in which the piston operates.

6. A piston comprising a head portion, a body portion, connectors between said head and body portions carrying bosses for a wrist pin, bracing fins joining the bosses with said head, said wrist pin and said fins being adapted to carry away heat, the connectors joining the head at their upper ends above the wrist pin and the body at their lower ends below the wrist pin, elongated ribs joining the upper ends of the connectors with the upper ends of the body, said head and body being isolated except at said ribs, said ribs having a contour corresponding to that of the body whereby their ability to conduct heat to the body is limited because of conductive action to the cylinder wall in which the piston operates, said ribs tending to draw the upper ends of the body portion inwardly when the connectors are moved outwardly due to expansive action of the heated head.

In confirmation hereof I affix my signature.

PAUL D. HARTOG.